United States Patent [19]

Towle et al.

[11] 4,038,226

[45] July 26, 1977

[54] METHOD AND COMPOSITION FOR SOLVENTLESS PRINTING

[75] Inventors: Jack Lewis Towle; John Herman Vander Ploeg, both of Holland, Mich.

[73] Assignee: Chemetron Corporation, Chicago, Ill.

[21] Appl. No.: 579,876

[22] Filed: May 22, 1975

[51] Int. Cl.² .................. C08G 12/12; C08G 12/32; C09D 11/10
[52] U.S. Cl. .................. 260/22 CQ; 260/21; 260/67.6 R; 260/850; 260/DIG. 38; 427/385 R
[58] Field of Search ............... 260/21, 22 CQ, 556 H, 260/850, 67.6 R, DIG. 38; 427/385

[56] References Cited

U.S. PATENT DOCUMENTS

| 2,593,930 | 4/1952 | Sprung et al. | 260/556 H |
|---|---|---|---|
| 2,626,933 | 1/1953 | Lober et al. | 260/556 H |
| 2,686,775 | 8/1954 | Howard | 260/556 H |
| 3,309,327 | 3/1967 | Gayer | 260/21 |
| 3,412,055 | 11/1968 | Koral | 260/21 |
| 3,481,891 | 12/1969 | Boylan et al. | 260/21 |
| 3,491,037 | 1/1970 | Keys et al. | 260/21 |
| 3,547,846 | 12/1970 | Coulter | 260/21 |
| 3,766,110 | 10/1973 | Curado et al. | 260/21 |

*Primary Examiner*—Ronald W. Griffin
*Attorney, Agent, or Firm*—Nicholas M. Esser

[57] ABSTRACT

Sulfonylarylhydrazides are used as latent catalysts for condensation reactions, particularly in the curing of solventless heat-setting printing ink compositions.

41 Claims, No Drawings

METHOD AND COMPOSITION FOR SOLVENTLESS PRINTING

BACKGROUND OF THE INVENTION

This invention relates to a method for curing certain resin precursors, and to novel thermosetting resin precursor compositions, such being useful to provide an ink suitable for solventless printing.

In many instances condensation reactions associated with the curing of certain condensate resin precursors require elevated temperatures to proceed at a suitable reaction rate. It is common, therefore, to employ a strong acid such as para-toluenesulfonic acid as a catalyst in these instances. Such an acid, however, catalyzes the condensation reaction to a significant extent even at room temperature and is unsuitable for applications wherein the promotion of the condensation reaction at room temperature cannot be tolerated.

This invention is of particular importance in the curing of amino resins, alkyd resins, modified alkyd resins (for example, those which have been modified by the incorporation of a drying oil, a vinyl monomer, a urea, a melamine or the like), and especially in the cross-linking of alkyd resins with an amino resin precursor.

Many resin precursors can be cured either by lengthy exposure to high temperature or under less severe conditions by the addition of a strong acid catalyst immediately prior to curing. The acid catalysts used heretofore in the art, however, must not be added to resin precursors which are intended to be stored because they promote the hardening or gellation of the compositions at a finite rate even at room temperature. The shelf stability of resin precursors containing such catalysts is very short, the compositions becoming unworkable after only a few hours of storage.

It is apparent that the addition of a strong acid catalyst, para-toluenesulfonic acid for example, to the resin precursor immediately prior to curing obviates the storage problem and reduces the severity of the conditions needed to cure the composition but this alternative suffers from the added cost and complications associated with a separate and additional processing step.

There is, therefore, a need for a condensate resin precursor composition having good shelf stability which will rapidly cure without the addition of a separate catalyst.

There further remains a need for a method for curing a condensate resin precursor which operates only at temperatures above typical storage temperatures (e.g. 20–40° C) and which does not require the addition of a catalyst immediately prior to curing.

SUMMARY OF THE INVENTION

It is, therefore, an object of this invention to provide a shelf-stable condensate resin precursor composition which will rapidly cure without the addition of a separate catalyst.

An additional object of this invention is to provide a method for curing a condensate resin precursor which operates only at temperatures above typical storage temperatures and which does not require the addition of a catalyst immediately prior to curing.

A further object of this invention is to provide a solventless, heat-setting printing ink.

It is still a further object of this invention to provide a method for solventless printing.

Other objects of the invention will become readily apparent from the following description of the invention.

It has been discovered that certain sulfonyl arylhydrazides can be employed as latent catalysts for condensation reactions. An important aspect of this discovery is that certain condensate resin precursors can be readily cured under relatively mild conditions in the presence of a catalytic amount of such a latent catalyst. The discovery is of particular importance in the homopolymerization of formaldehyde condensates of ureas, melamines, guanamines, and ethers thereof, and in the copolymerization of such a condensate with a co-condensate resin (i.e., the curing of a partially cross-linked copolymer formed from such a formaldehyde condensate and a co-condensate resin). The method of this invention is especially useful for the preparation of resins incorporating a melamine and a co-condensate resin.

As used herein, the term amino resin precursor means a formaldehyde condensate with a urea, a melamine, or a guanamine, and lower-alkyl ethers thereof, as well as physical mixtures of such a formaldehyde condensate or ether with a co-condensate resin, and partially cross-linked copolymers formed from such a formaldehyde condensate or ether and a co-condensate resin. The term co-condensate resin means a condensation- or addition-type polymer which is capable of undergoing further polymerization by condensation reactions at the sites of reactive functional groups in the polymer chain.

The objects of this invention are accomplished by heating an amino resin precursor in the presence of at least one latent catalyst selected from the group consisting of orthotoluenesulfonyl-ortho-tolylhydrazide, benzylsulfonylphenylhydrazide, benzenesulfonylphenylhydrazide, and para-toluenesulfonylphenylhydrazide to a curing temperature of from about the in situ decomposition temperature of the latent catalyst to about the decomposition temperature of the precursor.

The resin precursor can be physically mixed with the latent catalyst at any time prior to the initiation of, or during, the condensation reaction. The latent catalyst has little or no catalytic effect below a threshold temperature which is approximately equivalent to the in situ decomposition temperature of the latent catalyst employed, but above this temperature the latent catalyst readily catalyzes the condensation reaction. When the resin precursor is physically mixed with a latent catalyst prior to the initiation of the condensation reaction, a resin precursor composition which is a novel composition of matter is formed.

The co-condensate resin may be chosen from a wide range of polymeric materials containing carboxyl, hydroxyl, or amide functionalities. Epoxide resins and their fatty esters, alkyd and modified alkyd resins, certain types of acrylic and vinyl polymers such as hydrolyzed vinyl chloride/vinyl acetate copolymers, cellulosics such as nitrocellulose, ethyl cellulose, hydroxyethyl cellulose and carboxylated cellulose derivatives, modified styrene resins and the like containing hydroxyl, carboxyl, or amide groups exemplify the co-condensate resins contemplated in this invention. Other possible co-condensate resins will doubtless suggest themselves to those skilled in the art.

Alkyd resins are broadly defined as reaction products derived from a polyhydric alcohol and a polybasic acid. Polyhydric alcohols which are useful in forming alkyd resins are exemplified by ethylene glycol, diethylene glycol, propylene glycol, glycerol, trimethylolethane, trimethylolpropane, pentaerythritol, and sorbitol. Examples of useful polybasic acids are phthalic acid, isophthalic acid, terephthalic acid, tetrahydrophthalic acid, hexahydrophthalic acid, maleic acid, fumaric acid, adipic acid and sebacic acid. Polyhydric alcohols and polybasic acids are often derived from oils such as soya bean, linseed, cotton seed, castor and dehydrated castor, tall, tung, fish, perilla, oiticica, sunflower, safflower, walnut, and coconut oils. Monobasic acids, such as benzoic acid, are often added to moderate the cross-linking of certain resins.

Alkyd resins containing unsaturated groups may be modified by reacting these groups with vinyl monomers such as acrylates, methacrylates, and acrylonitrile, alone or in combination with styrene.

DESCRIPTION OF THE PREFERRED EMBODIMENTS

Of particular interest are the melamine types amino resin precursors having the following general formula:

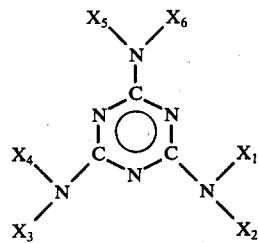

wherein $X_1$, $X_2$, $X_3$, $X_4$, $X_5$, and $X_6$ are the same as or different from one another and may be hydrogen or a radical represented by the formula $-CH_2-O-(CH_2)_n-CH_3$ in which $n$ is an integer from 0 to 3. Hexamethoxymethylmelamine is an example of an amino resin precursor which may be incorporated in a composition of this invention which, when pigmented, may be used as a heat-setting printing ink which requires no solvent.

In one embodiment of this invention, an alkyd resin is reacted with hexamethoxymethylmelamine to form a copolymer with a minimum amount of cross-linking and is, therefore, a precursor to a cured resin which is desired for a particular application. This copolymer is then mixed with a catalytic amount of a latent catalyst selected from the group consisting of ortho-toluenesulfonyl-ortho-tolylhydrazide, benzylsulfonylphenylhydrazide, benzenesulfonylphenylhydrazide, and paratoluenesulfonylphenylhydrazide to form a novel precursor composition. The catalyst is usually present at a concentration of from about 0.1% to about 10% by weight.

When the precursor composition is subjected to curing temperatures above a certain threshold temperature, which is approximately equivalent to the in situ decomposition temperature of the latent catalyst employed, the cross-linking of the copolymer is catalyzed, causing the hardening of the composition. The upper limit of the curing temperature is governed only by the decomposition temperature of the reaction mixture. Practically, however, the curing temperature should be in the range of from about 140° C. to about 260° C. and, preferably, from about 170° C. to about 200° C. The decomposition temperatures of ortho-toluenesulfonyl-ortho-tolylhydrazide, para-toluenesulfonylpheylhydrazide, benzenesulfonylphenylhydraizde, and benzylsulfonylphenylhdyrazide are reported to be 140°-142° C., 153.5° C., 145°-158° C., and 174° C., respectively.

The previously mentioned resin precursor compositions may be prepared by mixing the resin precursor with a catalytic amount of latent catalyst at any time prior to the initiation of the condensation reaction associated with the curing process.

The addition of the latent catalyst to the resin precursor during the manufacturing process forms a novel composition of matter that cures under relatively mild conditions, has good shelf stability, and does not require the addition of a separate catalyst prior to curing.

The method and composition of this invention have useful applications in the fields of paints and other coating compositions, adhesives, plastics and molding resins, as well as inks. Other areas of applications will doubtless suggest themselves to those skilled in the art.

An important aspect of this invention is the formulation of solventless heat-setting inks wherein a latent catalyzed drying oil-modified alkyd resin which has been partially cross-linked with an amino resin is used as a vehicle or medium for an ink pigment. The pigmented composition can be deposited on a substrate such as paper and the substrate subjected to curing temperatures to form a hard film. The resin precursor composition of this invention is particularly useful in formulating metal deco type inks. For this application, a partially cross-linked copolymer formed from the reaction of an amino resin precursor and a drying oil-modified alkyd resin which contains an acrylate or methacrylate ester moiety and has a residual hydroxyl or amide group is especially desirable.

The following examples are given to further illustrate the present invention. The scope of the invention, however, is not restricted to the specific details of the examples.

EXAMPLE 1

Part A. 1405 grams of alkali refined linseed oil, 305 grams of glycerine and 1.55 grams of lead decanoate (sold under the trademark Lead Ten-Chem) are heated to approximately 450° F under a nitrogen blanket. A mixture of 205 grams of isophthalic acid and 147.5 grams of benzoic acid is added to the reaction mixture after it has cooled to 410° F. The reaction mixture is then heated for 4 hours at a temperature of 400°-440° F. The product is a modified alkyd resin having an acid number of 10.6 and a hydroxyl value of 189.

Part B. 1750 grams of the modified alkyd resin of Part A is mixed with 750 grams of Cymel 303 hexamethoxymethylmelamine and the reaction mixture is heated for 10 hours at a temperature of 250°-280° F. The initial viscosity of the reaction mixture is 2.7 seconds and the final viscosity is 22.5 seconds both measured as 90 percent solutions in butyl carbitol at 25° C. in a Gardner-Holdt tube. The product is a hexamethoxymethylmelamine-modified alkyd resin precursor having an acid number of 5.6.

Part C. The product of Part B is used to test the stability of a resin precurosr composition containing paratoluenesulfonylphenylhydrazide. 83.5 grams of the product of Part B is mixed with 15 grams of phthalocyanine blue pigment and 1.5 grams of para-toluenesulfonylphenylhydrazide. This composition is compared to an identical formulation, but containing no catalyst. One sample of each composition is allowed to age at room temperature and another pair is allowed to age at 120° F. The viscosity of the compositions is measured on a Laray viscometer and the tack is measured on a Thwing-Albert inkometer. The effect of the aging on viscosity is shown in Table I and the effect on tack is shown in Table II.

TABLE I

| Storage Temperature | Weight on Laray rod (grams) | Catalyst Present | Initial Viscosity (Seconds) | Viscosity After 1 Day Storage | % Δ | Viscosity After 2 Days Storage | % Δ |
|---|---|---|---|---|---|---|---|
| RT | 0 | Yes | 65.6 | 57.4 | −12.5 | 57 | −13.1 |
| RT | 0 | No | 59.8 | 62.6 | + 4.7 | — | — |
| RT | 200 | Yes | 22.4 | 20.5 | − 8.5 | 21.0 | − 6.7 |
| RT | 200 | No | 20.6 | 21.6 | + 4.9 | — | — |
| RT | 400 | Yes | 13.2 | 12.2 | − 7.6 | 12.5 | − 5.3 |
| RT | 400 | No | 12.2 | 12.7 | + 4.1 | — | — |
| RT | 600 | Yes | 9.3 | 8.8 | − 5.4 | 9.0 | − 3.2 |
| RT | 600 | No | 8.8 | 9.0 | + 2.3 | — | — |
| 120° F | 0 | Yes | 65.6 | 78.6 | +19.8 | 81.8 | +24.7 |
| 120° F | 0 | No | 59.8 | 61.6 | + 3.0 | — | — |
| 120° F | 200 | Yes | 22.4 | 26.6 | +18.8 | 28.8 | +28.6 |
| 120° F | 200 | No | 20.6 | 22.0 | + 6.8 | — | — |
| 120° F | 400 | Yes | 13.2 | 16.0 | +21.2 | 16.0 | +21.2 |
| 120° F | 400 | No | 12.2 | 13.3 | + 9.0 | — | — |
| 120° F | 600 | Yes | 9.3 | 11.4 | +22.6 | 12.0 | +29.0 |
| 120° F | 600 | No | 8.8 | 9.2 | + 4.5 | — | — |

TABLE II

| STORAGE TEMPERATURE | CATALYST PRESENT | INITIAL TACK | TACK AFTER 1 DAY STORAGE | % Δ | TACK AFTER 2 DAY STORAGE | % Δ |
|---|---|---|---|---|---|---|
| RT | YES | 10.7 | 10.2 | − 4.6 | 10.2 | − 4.6 |
| RT | NO | 12.3 | 11.2 | − 8.9 | — | — |
| 120° F | YES | 10.7 | 13.4 | +25.2 | 13.4 | +25.2 |
| 120° F | NO | 12.3 | 10.4 | −15.4 | — | — |

From tables I and II it is apparent that the effect of short term aging on the composition containing para-toluenesulfonylphenylhydrazide was not significantly different from the effect on the system containing no para-toluenesulfonylphenylhydrazide. The viscosity of the catalyzed system decreased slightly upon storage at room temperature whereas the catalyzed system showed a slight increase. The viscosity of the catalyzed system increased slightly more than that of the uncatalyzed system upon storage at 120° F.

From Table II it is apparent that the catalyzed system increased in tack slightly upon storage at 120° F whereas the uncatalyzed system showed a slight decrease in tack. Both the catalyzed and uncatalyzed system showed a slight decrease in tack upon storage at room temperature.

EXAMPLE 2

Part A. 1250 grams of alkali refined linseed oil, 190 grams of pentaerythritol, 166 grams of glycerine and 1.5 grams of Lead Ten-Chem lead decanoate are heated under a blanket of nitrogen for approximately 1 hour at a temperature of 410°–460° F. A mixture of 233 grams of isophthalic acid and 170 grams of benzoic acid is then added to the reaction mixture. Heating at 410°–460° F is continued for an additional 4 hours. The resultant product is a modified alkyd resin having an acid number of 4.0 and a viscosity of 18 seconds as a 90 percent solution in butyl carbitol at 25° C in a Gardner-Holdt tube.

Part B. 1500 grams of the modified alkyd resin from Part A of this example is added to 500 grams of Cymel 301 hexamethoxymethylmelamine. The mixture is heated at 240°–250° F for 5½ hours during which time the viscosity of the mixture as 90 per cent solution in butyl carbitol (in a Gardner-Holdt tube) increases from 17 seconds to 174 seconds at 25° C.

EXAMPLE 3

Part A. 11,240 grams of alkali refined linseed oil, 2,440 grams of glycerine, and 12.4 grams of Lead Ten-Chem lead decanoate are heated to 450° F under a nitrogen blanket. A mixture of 1,650 grams of isophthalic acid and 1,180 grams of benzoic acid is then added to the reaction mixture. The temperature is allowed to slowly fall from 450° to 200° F over a 3 hour period. The product is a modified alkyd resin having an acid number of 13.8, a hydroxyl value of 184 and a viscosity of 4.4 as a 90 percent solution in butyl carbitol at 25° C in a Gardner-Holdt tube.

Part B. 8,000 grams of the modified alkyd resin from Part A is added to 3,430 grams of Cymel 303 hexamethoxymethylmelamine and the reaction mixture is heated at 275°–285° F for 3 hours. The mixture is then allowed to cool slowly to room temperature. The product is a hexamethoxymethylmelamine-modified alkyd resin precursor.

EXAMPLE 4

A catalyst dispersion is prepared by mixing 15 grams of para-toluenesulfonylpheylhydrazide with 34 grams of the resin precursor of Example 2, part B on a 3 roll mill. This catalyst dispersion is used to test the cure rate and long-range stability of ink compositions containing para-toluenesulfonylphenylhydrazide. The catalyst dispersion is mixed with a resin percursor and a pigment flushing containing phthalocyanine blue as identified and in the porportions shown in Table III. The length of time needed to cure each of the inks to a hard film on a metal plate is shown in Table IV. The results of the stability study are shown in Tables V and VI. The viscosities shown in Table V were taken with a Laray viscometer and the tack values shown in Table VI were taken with a Thwing-Albert inkometer.

TABLE III

| INKS | A | B | C | D |
|---|---|---|---|---|
| Pigment Flushing* | 20 grams | 20 grams | 20 grams | — |

TABLE III-continued

| INKS | A | B | C | D |
|---|---|---|---|---|
| Copolymer of Example 2B | 30 grams | 26.5 grams | 23 grams | 60 grams |
| Catalyst Dispersion | — | 5.0 grams | 10.0 grams | — |
| Copolymer of Example 3B | — | — | — | 25 grams |

*38% Phthalocyanine Blue and 62% Product of Example 3 part B, by weight

TABLE IV

| STORAGE TEMPERATURE | COMPOSITION | CURE TEMPERATURE (° F.) | INITIAL CURE TIME (SECONDS) | CURE TIME AFTER 11 DAYS STORAGE (SECONDS) | CURE TIME AFTER 27 DAYS STORAGE (SECONDS) |
|---|---|---|---|---|---|
| RT | A | 350 | 180 | 180 | 180 |
| RT | A | 400 | 90 | 90 | 90 |
| RT | B | 350 | 40 | 40 | 40 |
| RT | B | 400 | 8 | 8 | 10 |
| RT | C | 350 | 30 | 25 | 30 |
| RT | C | 400 | 5 | 5 | 6 |
| 120° F | A | 350 | 180 | 180 | 180 |
| 120° F | A | 400 | 90 | 90 | 90 |
| 120° F | B | 350 | 40 | 40 | 40 |
| 120° F | B | 400 | 8 | 9 | 9 |
| 120° F | C | 350 | 30 | 30 | 35 |
| 120° F | C | 400 | 5 | 7 | 7 |

TABLE V

| STORAGE TEMPERATURE | COMPOSITION | WEIGHT ON LARAY ROD (GRAMS) | INITIAL VISCOSITY (SECONDS) | VISCOSITY AFTER 11 DAYS STORAGE | %Δ | VISCOSITY AFTER 27 DAYS STORAGE | %Δ | VISCOSITY AFTER 54 DAYS STORAGE | %Δ |
|---|---|---|---|---|---|---|---|---|---|
| RT | A | 100 | 32.7 | 41.0 | 25.4 | 40.8 | 24.8 | 42.2 | 29.1 |
| RT | A | 200 | 20.2 | 23.2 | 14.9 | 23.6 | 16.8 | 26.2 | 29.7 |
| RT | A | 400 | 12.3 | 14.4 | 17.1 | 15.0 | 22.0 | 18.2 | 48.0 |
| RT | B | 100 | 29.6 | 34.0 | 14.9 | 35.5 | 19.9 | 38.8 | 31.1 |
| RT | B | 200 | 22.3 | 28.2 | 26.5 | 28.0 | 25.6 | 29.4 | 31.8 |
| RT | B | 400 | 13.1 | 17.0 | 29.8 | 17.1 | 30.5 | 20.0 | 52.7 |
| RT | C | 100 | 37.7 | 45.5 | 20.4 | 46.2 | 22.5 | 48.4 | 28.4 |
| RT | C | 200 | 25.0 | 31.0 | 24.0 | 30.6 | 22.4 | 32.8 | 31.2 |
| RT | C | 400 | 15.6 | 19.0 | 23.1 | 18.8 | 20.5 | 21.4 | 37.2 |
| 120° F | A | 100 | 29.2 | 38.8 | 32.9 | 45.0 | 54.0 | 54.2 | 85.6 |
| 120° F | A | 200 | 20.1 | 27.6 | 37.3 | 29.7 | 47.8 | 37.6 | 84.5 |
| 120° F | A | 400 | 12.5 | 17.0 | 36.0 | 18.5 | 48.0 | 28.0 | 124.0 |
| 120° F | B | 100 | 36.6 | 45.0 | 23.0 | 45.0 | 23.0 | 48.2 | 31.7 |
| 120° F | B | 200 | 24.0 | 31.2 | 30.0 | 30.1 | 25.4 | 34.4 | 43.3 |
| 120° F | B | 400 | 14.7 | 19.0 | 29.3 | 18.5 | 25.9 | 22.2 | 51.0 |
| 120° F | C | 100 | 47.5 | 52.1 | 9.7 | 51.8 | 9.1 | 53.4 | 12.4 |
| 120° F | C | 200 | 31.5 | 35.5 | 12.7 | 36.0 | 14.3 | 38.2 | 21.3 |
| 120° F | C | 400 | 19.3 | 22.0 | 14.0 | 21.5 | 11.4 | 23.8 | 23.3 |

TABLE VI

| STORAGE TEMPERATURE | COMPOSITION | INITIAL TACK | TACK AFTER 11 DAYS STORAGE | %Δ | TACK AFTER 27 DAYS STORAGE | %Δ | TACK AFTER 54 Days STORAGE | %Δ |
|---|---|---|---|---|---|---|---|---|
| RT | A | 15.8 | 16.0 | 1.3 | 15.8 | — | 16.4 | 5.1 |
| RT | B | 14.4 | 15.6 | 8.3 | 15.4 | 6.9 | 17.0 | 18.1 |
| RT | C | 14.4 | 15.4 | 6.9 | 15.6 | 8.3 | 17.6 | 22.2 |
| RT | D | 7.2 | 7.8 | 8.3 | 7.6 | 5.6 | 8.0 | 11.1 |
| 120° F | A | 15.2 | 15.8 | 3.9 | 15.6 | 2.6 | 17.2 | 13.2 |
| 120° F | B | 16.6 | 18.2 | 9.6 | 18.0 | 8.4 | 20.8 | 25.3 |
| 120° F | C | 16.4 | 18.4 | 12.2 | 18.2 | 11.0 | 21.6 | 24.1 |
| 120° F | D | 6.6 | 7.8 | 18.2 | 7.5 | 12.0 | 7.8 | 18.2 |

The results contained in Table IV show that resin precursor compositions B and C, containing 3% and 6% para-toluenesulfonylphenylhydrazide, respectively, cured in substantially shorter periods of time than composition A which contained no para-toluenesulfonylphenylhydrazide. At 350° F (177° C) compositions B and C cured, respectively, 78 and 83% faster than composition A. At 400° F (210° C.) compositions B and C cured respectively 91 and 94% faster than composition A. There was essentially no difference in cure time observed for any of the compositions over the 27 day storage period at either room temperature or 120° F (49° C.).

The results shown in Table V indicate that the viscosity of compositions A, B and C had essentially the same percentage increase after 54 days of storage at room temperature. The same compositions stored at 120° F for 54 days showed significant differences in the percentage increases in viscosity. The viscosity of composition A increased approximately 100% while the viscosity of composition B increased approximately 40% and the viscosity of composition C increased approximately 20%. The presence of the para-toluenesulfonylphenylhydrazide had the surprising effect of lowering the percentage viscosity increase below that exhibited by the non-catalyzed resin composition upon storage at 120° F.

Table VI shows that all of the four resin precursor compositions increased in tack upon storage about equally. The difference between the tack of the compositions stored at room temperature and those stored at 120° F was not significant.

EXAMPLE 5

Two catalyst dispersions are prepared in the proportions shown in Table VII. The catalyst dispersions, X and Y, containing ortho-toluenesulfonyl-ortho-tolylhydrazide and para-toluenesulfonylphenyldrazide, respectively, are prepared in a Hoover type muller. The catalyst dispersions are mixed with a resin precursor and a pigmented flushing containing phthaocyanine blue as identified and in the proportions shown in Table VIII. The length of time needed to cure the inks to a hard film is shown in Table IX. In one method of testing the cure times, drawdowns of the inks on paper are heatset at 350° F. by pressing the paper against a heated metal surface, the temperature of which is measured by a thermocouple. The results shown in Table IX indicate that both ortho-toluenesulfonyl-ortho-tolylhydrazide and para-toluenesulfonylphenylhydrazide are effective latent catalysts.

TABLE VII

| Catalyst Dispersion | X (grams) | Y (grams) |
| --- | --- | --- |
| ortho-Toluenesulfonyl-ortho-tolyhydrazide | 1.8 | — |
| Product of Example 2B | 4.2 | 4.2 |
| para-Toluenesulfonylphenylhydrazide | — | 1.8 |

TABLE VIII

| INKS | D | E | F | G | H | I | J |
| --- | --- | --- | --- | --- | --- | --- | --- |
| Pigment Flushing* | 6.0g | 6.0g | 6.0g | 6.0g | 6.0g | 6.0g | 6.0g |
| Copolymer of Example 2B | 4.0g | 3.3g | 2.83g | 2.37g | 3.3g | 2.83g | 2.37g |
| Catalyst Dispersion X | — | 1.0g | 1.67g | 2.33g | — | — | — |
| Catalyst Dispersion Y | — | — | — | — | 1.0g | 1.67g | 2.33g |

*30% Phthalocyanine Blue and 70% Product of Example 3 part B, by weight

TABLE IX

| INK | D | E | F | G | H | I | J |
| --- | --- | --- | --- | --- | --- | --- | --- |
| Cure Time at 350° F (Seconds) | 25 | 7 | 5 | 4 | 15 | 10 | 5 |

It will be evident to those skilled in the art that modifications of the invention, as described above, can be made without departing from the scope of the claims.

Therefore, we claim:

1. A method of polymerizing an amino resin precursor which comprises heating the precursor in the presence of a catalytic amount of at least one latent catalyst selected from the group consisting of ortho-toluenesulfonyl-ortho-tolylhydrazide, benzylsulfonylphenylhydrazide, benzenesulfonylphenylhydrazide, and para-toluenesulfonylphenylhydrazide to a curing temperature of from about the in situ decomposition temperature of the latent catalyst to about the decomposition temperature of the precursor.

2. The method of claim 1 wherein the curing temperature is from about 140° to about 260° C.

3. The method of claim 1 wherein the curing temperature is from about 170° to about 200° C.

4. The method of claim 1 wherein the latent catalyst is para-toluenesulfonylphenylhydrazide.

5. The method of claim 1 wherein the latent catalyst is present at a concentration of from about 0.1% to about 10% by weight.

6. The method of claim 1 wherein the amino resin precursor is a formaldehyde condensate of a urea, a melamine, or a guanamine, or a lower-alkyl ether of said condensate.

7. The method of claim 6 wherein the amino resin precursor is a compound of the general formula

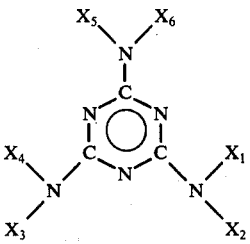

wherein $X_1$, $X_2$, $X_3$, $X_4$, $X_5$, and $X_6$ are the same as or different from one another and are selected from the group consisting of hydrogen and a radical represented by the formula $-CH_2-O-(CH_2)_nCH_3$, in which $n$ is an integer from 0 to 3.

8. The method of claim 7 wherein each X is $-CH_2-O-CH_3$.

9. The method of claim 8 wherein the latent catalyst is para-toluenesulfonylphenylhydrazide.

10. The method of claim 1 wherein the amino resin precursor is a mixture of a co-condensate resin containing a carboxyl, hydroxyl or amide functionality and a formaldehyde condensate of a urea, a melamine or a guanimine, or a lower-alkyl ether of said condensate.

11. The method of claim 10 wherein the co-condensate resin is a dryine oil-modified alkyd resin.

12. The method of claim 10 wherein the amino resin precursor in a mixture of the co-condensate and a compond of the general formula

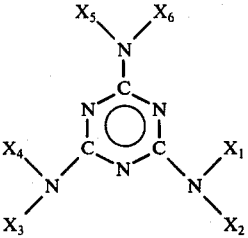

wherein $X_1$, $X_2$, $X_3$, $X_4$, $X_5$, and $X_6$ are the same as or different from one another and are selected from the group consisting of hydrogen and a radial represented by the formula $-CH_2-O-(CH_2)_nCH_3$, in which $n$ is an integer from 0 to 3.

13. The method of claim 12 wherein X is $-CH_2-O-CH_3$.

14. The method of claim 13 wherein the co-condensate resin is a drying oil-modified alkyd resin.

15. The method of claim 14 wherein the latent catalyst is para-toluenesulfonylphenylhydrazide.

16. The method of claim 1 wherein the amino resin precursor is a partially cross-linked copolymer of a co-condensate resin containing a carboxyl, hydroxyl or amide functionality and a formaldehyde condensate of a urea, a melamine, or a guanimine, or a lower-alkyl ether of said condensate.

17. The method of claim 16 wherein the amino resin precursor is a partially cross-linked copolymer of the co-condensate resin and a compound of the general formula

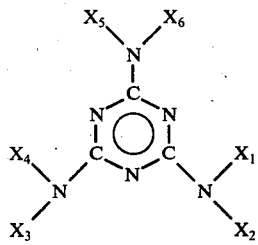

wherein $X_1$, $X_2$, $X_3$, $X_4$, $X_5$, and $X_6$ are the same as or different from one another and are selected from the group consisting of hydrogen and radical represented by the formula $-CH_2-O-(CH_2)_nCH_3$, in which $n$ is an integer from 0 to 3.

18. The method of claim 17 wherein each X is $-CH_2-O-CH_3$.

19. The method of claim 18 wherein the co-condensate resin is a drying oil-modified alkyd resin.

20. The method of claim 19 wherein the latent catalyst is para-toluenesulfonylphenylhydrazide.

21. A method for solventless printing which comprises reacting a drying oil-modified alkyd resin and hexamethoxymethylmelamine to form a partially cross-linked copolymer; mixing the copoylmer with a pigment and a catalytic amount of at least one latent catalyst selected from the group consisting of ortho-toluenesulfonyl-ortho-tolylhydrazide, benzylsulfonylphenylhydrazide, benzenesulfonylphenylhydrazide, and para-toluenesulfonylphenylhydrazide; depositing the mixture on a substrate; and subjecting the mixture to a curing temperature of from about the in situ decomposition temperature of the latent catalyst to about the decomposition temperature of the mixture.

22. The method of claim 21 wherein the drying oil-modified alkyd resin contains an acrylate or methacrylate ester moiety and has a residuel hydroxyl or amide group.

23. A resin precursor composition comprising an amino resin precursor and from about 0.1 to about 10% by weight of a latent catalyst selected from the group consisting of ortho-toluenesulfonyl-ortho-tolyhydrazide, benzylsulfonylphenylhydrazide, benzenesulfonylphenylhydrazide, and para-toluenesulfonylphenylhydrazide.

24. The composition of claim 23 wherein the latent catalyst is para-toluenesulfonylphenylhydrazide.

25. The composition of claim 23 further comprising a pigment.

26. The composition of claim 23 wherein the amino resin precursor is a formaldehyde condensate of a urea, a melamine, or a guanimine, or a lower-alkyl ether of said condensate.

27. The composition of claim 23 wherein the amino resin precursor is a compound of the general formula

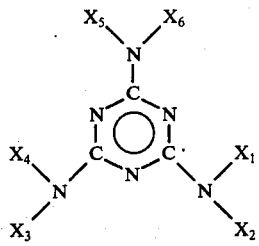

wherein $X_1$, $X_2$, $X_3$, $X_4$, $X_5$, and $X_6$ are the same as or different from one another and are selected from the group consisting of hydrogen and a radical represented by the formula $-CH_2-O-(CH_2)_nCH_3$, in which $n$ is an integer from 0 to 3.

28. The composition of claim 27 wherein each X is $-CH_2-O-CH_3$.

29. The composition of claim 23 wherein the amino resin precursor is a mixture of a co-condensate resin containing a carboxyl, hydroxyl or amide functionality and a formaldehyde condensate of a urea, a melamine or a guanamine or a lower-alkyl ether of said condensate.

30. The composition of claim 29 wherein the co-condensate resin is a drying oil-modified alkyd resin.

31. The composition of claim 29 wherein the amino resin precursor is a mixture of the co-condensate resin and compound of the general formula

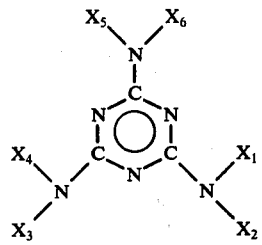

wherein $X_1$, $X_2$, $X_3$, $X_4$, $X_5$, and $X_6$ are the same as or different from one another and are selected from the group consisting of hydrogen and a radical represented by the formula $-CH_2-O-(CH_2)_nCH_3$, in which $n$ is an integer from 0 to 3.

32. The composition of claim 31 wherein each X is $-CH_2-O-CH_3$.

33. The composition of claim 32 wherein the co-condensate resin is a drying oil-modified alkyd resin.

34. The composition of claim 33 wherein the latent catalyst is para-toluenesulfonylphenylhydrazide.

35. The composition of claim 34 further comprising a pigment.

36. The composition of claim 23 wherein the amino resin precursor is a partially cross-linked copolymer of a co-condensate resin containing a carboxyl, hydroxyl, or amide functionality and a formaldehye condensate of a urea, a melamine, or a guanamine, or a lower-alkyl ether of said condensate.

37. The composition of claim 36 wherein the amino resin precursor is a partially cross-linked copolymer of the co-codensate resin and a compound of the general formula

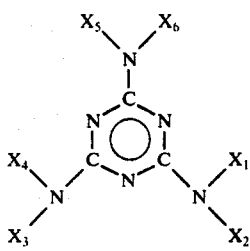

wherein $X_1$, $X_2$, $X_3$, $X_4$, $X_5$, and $X_6$ are the same as or different from one another and are selected from the group consisting of hydrogen and radical represented by the formula $-CH_2-O-(CH_2)_nCH_3$, in which $n$ is an integer from 0 to 3.

38. The composition of claim 37 wherein each X is $-CH_2-O-CH_3$.

39. The composition of claim 38 wherein the co-condensate resin is a drying oil-modified alkyd resin.

40. The composition of claim 39 wherein the latent catalyst is para-toluenesulfonylphenylhydrazide.

41. The composition of claim 40 further comprising a pigment.

* * * * *

UNITED STATES PATENT AND TRADEMARK OFFICE
CERTIFICATE OF CORRECTION

PATENT NO. : 4,038,226
DATED : July 26, 1977
INVENTOR(S) : Jack Lewis Towle and John Herman Vander Ploeg It is certified that error appears in the above-identified patent and that said Letters Patent are hereby corrected as shown below:

Column 11, line 1, Correct the spelling of the word guanamine.

Column 11, line 64, Correct the spelling of the word guanamine.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*